United States Patent
Choi et al.

(10) Patent No.: US 8,261,145 B2
(45) Date of Patent: *Sep. 4, 2012

(54) APPARATUS AND METHOD FOR TRANSMITTING/RECEIVING SIGNAL IN COMMUNICATION SYSTEM

(75) Inventors: Seung-Hoon Choi, Suwon-si (KR); Jae-Yoel Kim, Suwon-si (KR); Gyu-Bum Kyung, Suwon-si (KR); Hong-Sil Jeong, Seoul (KR); Dong-Seek Park, Yongin-si (KR); Young-Ho Kim, Suwon-si (KR); Kyeong-Cheol Yang, Seoul (KR); Hyun-Koo Yang, Seoul (KR); Se-Ho Myung, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1357 days.

This patent is subject to a terminal disclaimer.

(21) Appl. No.: 11/865,189

(22) Filed: Oct. 1, 2007

(65) Prior Publication Data
US 2008/0082890 A1  Apr. 3, 2008

(30) Foreign Application Priority Data
Oct. 2, 2006  (KR) ............... 10-2006-0097346

(51) Int. Cl.
*H04L 1/18* (2006.01)
*H04L 1/22* (2006.01)

(52) U.S. Cl. ............ 714/748; 714/800

(58) Field of Classification Search .......... None
See application file for complete search history.

(56) References Cited

U.S. PATENT DOCUMENTS

| 5,426,513 A * | 6/1995 | Scorse et al. ...... 358/426.02 |
| 7,584,399 B2 | 9/2009 | Kyung et al. | |
| 2003/0021240 A1 * | 1/2003 | Moon et al. ............ 370/320 |

FOREIGN PATENT DOCUMENTS

| KR | 10-2002-0085854 A | 11/2002 |
| KR | 10-2005-0046468 A | 5/2005 |
| KR | 10-2005-0120818 A | 12/2005 |
| KR | 10-2006-0079118 A | 7/2006 |

* cited by examiner

*Primary Examiner* — Ajay Bhatia
*Assistant Examiner* — Dipakkumar Gandhi
(74) *Attorney, Agent, or Firm* — Jefferson IP Law, LLP (57) ABSTRACT

An apparatus and method for transmitting/receiving a signal in a communication system are provided. The method includes inputting an information word during initial transmission and transmitting a first code word created by encoding the inputted information word based on a first coding ratio, and transmitting a portion of a second code word created by encoding the first code word based on a second coding ratio at a retransmission request. Accordingly, the apparatus and method provide for transmitting/receiving signals in a communication system in such a manner that the complexity of the communication system is reduced.

4 Claims, 6 Drawing Sheets

APPARATUS AND METHOD FOR TRANSMITTING/RECEIVING SIGNAL IN COMMUNICATION SYSTEM

PRIORITY

This application claims the benefit under 35 U.S.C. §119(a) of a Korean patent application filed with the Korean Intellectual Property Office on Oct. 2, 2006 and assigned Serial No. 2006-97346, the entire disclosure of which is hereby incorporated by reference.

BACKGROUND OF THE INVENTION

1. Field of the Invention

The present invention relates to a communication system. More particularly, the present invention relates to an apparatus and method for transmitting/receiving signals in a communication system using a Hybrid Automatic Repeat reQuest (HARQ).

2. Description of the Related Art

As generally known in the art, a fundamentally important issue in the field of communication is to what extent data can be transmitted efficiently and reliably via channels. In line with the ever-increasing demand for faster communication systems capable of processing and transmitting various types of information (e.g. images, radio data), as well as providing conventional voice communication, extensive study is being made to improve system efficiency by adopting a channel coding scheme suitable for each system.

It is inevitable that, during data transmission, errors occur due to noise, interference, or fading depending on the channel condition and that such errors cause information loss. In order to reduce such information loss, it is customary to employ various error control schemes based on channel characteristics so that the system reliability improves.

Error control schemes for communication systems are generally classified into a Forward Error Correction (FEC) scheme and an Automatic Repeat reQuest (ARQ) scheme. The FEC scheme employs a code having error correction capability to correct the error of received information. The FEC scheme is used if there is no feedback channel for notifying the transmitting end whether information transmission has succeeded or failed. The ARC scheme employs, for example, a Cyclic Redundancy Check (CRC) code having excellent error detection capability so that, if an error is detected from received information, a retransmission request is sent to the transmitting end via a feedback channel.

The FEC scheme has a problem in that, if the receiving end fails to correct errors, erroneous information is delivered to users without correction. If a highly reliable system is to be implemented to avoid such a problem, a large number of codes must be used to correct errors. This increases the complexity of the decoding process and renders the implementation difficult.

Although the ARQ scheme has the advantage of simple structure and high reliability, it has a serious problem in that, as the channel error rate increases, the amount of processed information decreases abruptly. In order to overcome the problems of the ARQ and FEC schemes, they are properly combined to provide a HARQ scheme.

The HARQ scheme is classified into type I, type II, and type III systems.

The type I HARQ system has the simplest hybrid structure and encodes transmitted information words for error detection and error correction. A system classified as a type I HARQ system is further classified into a type of system in which a single code conducts both error detection and error correction, and another type of system in which two different codes respectively conduct error detection and error correction. The type I HARQ system has a problem in that, as the channel error rate increases, the amount of processed information decreases abruptly and that, if a single error correction code is used, overhead occurs since a predetermined amount of parity bits must be transmitted for error correction regardless of the channel condition.

The type II HARQ system does not discard packets, even if an error has been detected. Instead, additional parities are solely retransmitted and are combined with the packets. This increases the decoding efficiency and avoids the above-mentioned drawback.

The type III HARQ system also retransmits additional parities and combines them with erroneous packets so that the decoding efficiency improves, as in the case of the type II HARQ system. In general, packets to be retransmitted by the type II HARQ system include additional parities alone and, if there is a retransmission request, additional packets that have not been sent are transmitted in order, combined with previously received packets, and decoded.

The HARQ operation in the type II HARQ system will now be described in more detail.

Devices adapted for HARQ transmission/reception will hereinafter be referred to as HARQ entities. The transmitting-side HARQ entity is adapted to transmit and retransmit HARQ packets. The receiving-side HARQ entity is adapted to combine and soft-combine retransmitted HARQ packets and to transmit an Acknowledgement/Negative Acknowledgement (ACK/NACK) response. The transmitting/receiving HARQ entities consist of a number of HARQ processors, which are basic unit devices for transmitting/receiving user packets. The transmitting-side HARQ processors are adapted to transmit and retransmit user packets, and the receiving-side HARQ processors are adapted to receive, combine, and soft-combine user packets.

Pairs of HARQ processors exist in the transmitting and receiving sides, and each HARQ entity has a number of HARQ processors so as to enable continuous transmission/reception. Particularly, the HARQ processors transmit user packets, receive corresponding ACK/NACK information, and conduct retransmission. If only a single HARQ processor exists, it is not until user data is transmitted and corresponding ACK/NACK information is received that other packets can be transmitted. If a number of processors exist, other processors can transmit data while a processor waits to receive an ACK/NACK. This guarantees continuous transmission/reception.

The basic operation of the HARQ processors will now be described.

Transmitting-side HARQ processors channel-code user data, transmit it, and store it in a buffer in order to retransmit it at a later time. Upon receiving an ACK regarding the stored data, the data is flushed. Upon receiving a NACK regarding the data, the data is retransmitted according to a retransmission protocol. A retransmission protocol will be described later in more detail with reference to FIGS. 1A and 1B.

Receiving-side HARQ processors receive data via physical channels, channel-decode it and confirm if an error has occurred through a CRC. If an error has occurred, the data is stored in the buffer, and a NACK is transmitted. If retransmission data regarding the data is received later, the retransmitted data is combined or soft-combined with the data stored in the buffer in order, and is channel-decoded. The error check is then conducted again. If it is confirmed that the error still exists, a NACK is transmitted, and the above process is repeated. If the error has been cleared, an ACK is transmitted.

In summary, erroneous data is not discarded, but is combined or soft-combined with retransmitted data and is channel-decoded. In this manner, the HARQ operation reduces the BLock Error Rate (BLER) regarding packets.

A process for dividing a code word, which has been encoded by using a mother code, into packets of a predetermined length for retransmission in the type II HARQ system and a conventional retransmission protocol method will now be described with reference to FIGS. 1A and 1B.

Figure 1A:
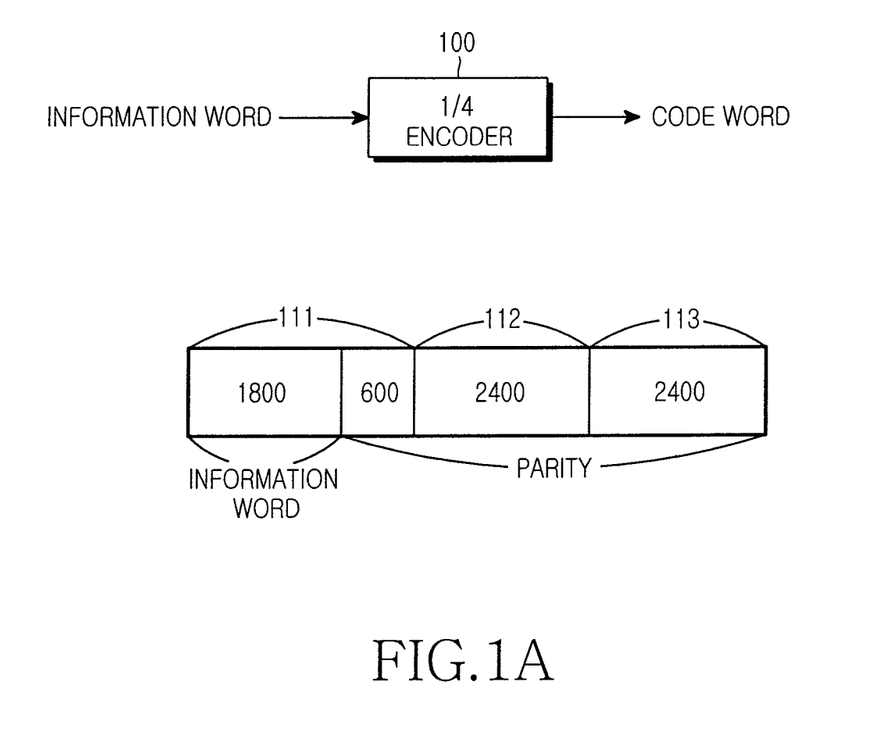
FIG. 1A illustrates a code word for retransmission in a conventional type II HARQ system.

FIG. 1A illustrates a code word for retransmission in the conventional type II HARQ system.

Referring to FIG. 1A, a code word composed of a mother code 100 is divided into packets of a predetermined length. It is assumed that the coding ratio of the mother code for channel coding is 1/4 and that the mother code has a systematic structure. The code word packet encoded by using the code word 100 has a length corresponding to 7200 symbols, and the length of the information word in the packet corresponds to 1800 symbols. The parity length corresponds to 5400 symbols. The code word packet is divided into three packets 111-113 each having a length of 2400 for retransmission in the type II HARQ system.

Figure 1B:
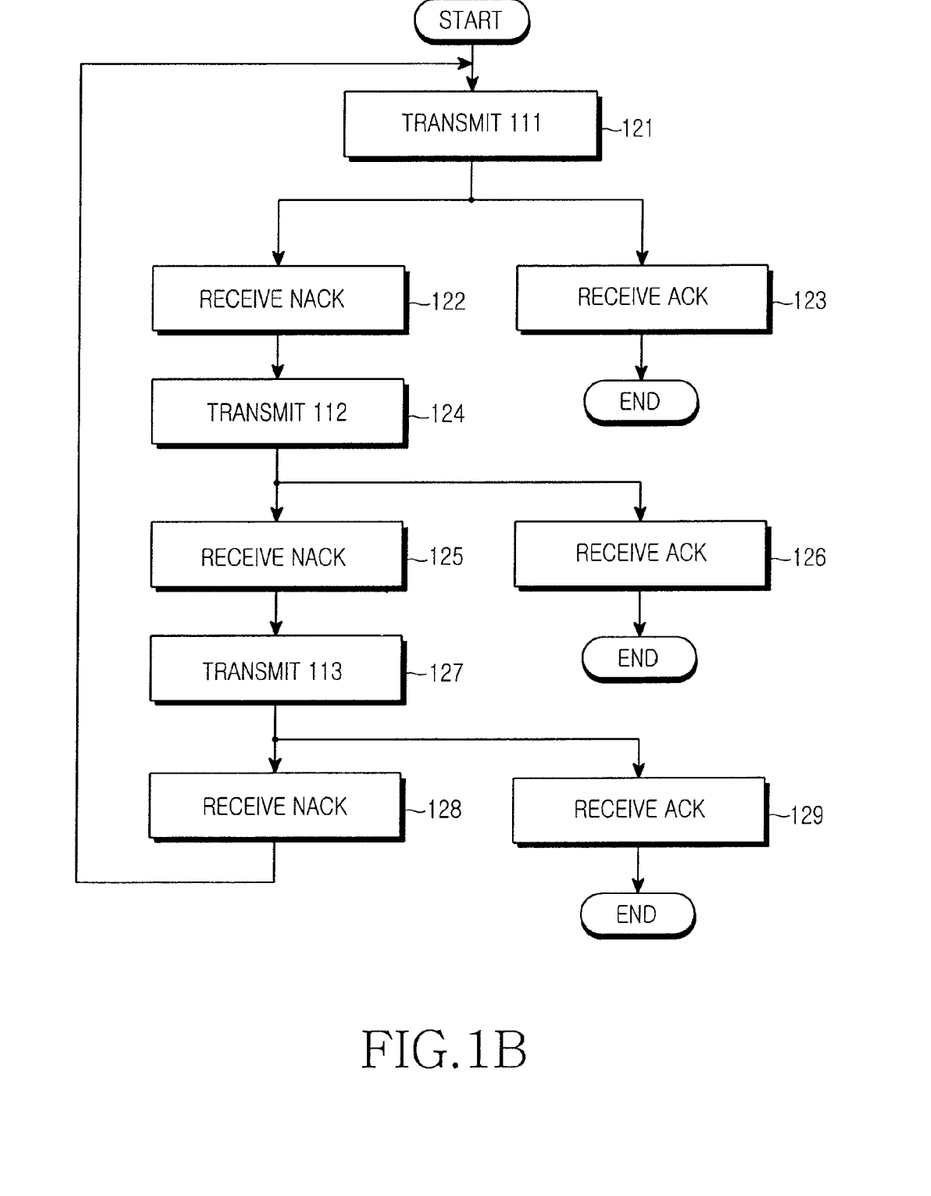
FIG. 1B illustrates a process for retransmission in a conventional type II HARQ system.

FIG. 1B shows a process for retransmission in the conventional type II HARQ system.

Referring to FIG. 1B, the transmitter sends the first packet 111 to the receiver in the initial transmission step 121. If the transmitter receives an ACK from the receiver in step 123, the process is terminated. If the transmitter received a NACK from the receiver in step 122 after transmitting the first packet 111 to the receiver in step 121, the transmitter sends the next packet, i.e. the second packet 112, in step 124.

If the transmitter receives an ACK from the receiver in step 126 after transmitting the second packet 112 to the receiver in step 124, the process is terminated. If the transmitter receives a NACK from the receiver in step 125 after transmitting the second packet 112 to the receiver in step 124, the transmitter transmits the next packet, i.e. the third packet 112, in step 127.

If the transmitter receives an ACK from the receiver in step 129 after transmitting the third packet 113 to the receiver in step 127, the process is terminated. If the transmitter receives a NACK from the receiver in step 128 after transmitting the third packet 113 to the receiver in step 127, the transmitter returns to step 121 and transmits the first packet 111, because the code word has no more packets to send. If the transmitter still receives a NACK, rather than an ACK, after the maximum number of allowable transmissions is reached, the transmission process is aborted. The maximum number of allowable transmissions is defined as the number of allowable retransmissions plus that of the initial transmission. If the transmission process is carried out on an assumption that the maximum number of allowable transmissions is three, the process is terminated after a NACK is received from the receiver in step 128.

The effective coding ratio, which is related to type II HARQ retransmissions according to the protocol shown in FIG. 1B, will now be described. The effective coding ratio is defined as the ratio between the length of an information word to be transmitted and the length of total packets actually transmitted. FIG. 1B will be referred to for more detailed descriptions. When the transmitter initially transmits the first packet 111, which includes an information word, in step 121, the length of the information word is 1800, the length of the packet is 2400, and the effective ratio is 3/4. When the transmitter sends the second packet 112 in step 124, the length of the information word is 1800, the length of total packets transmitted is 4800, and the effective coding ratio is 3/8. When the third packet 113 of the entire code word packet composed of a mother code is retransmitted, the length of the information word is 1800, the length of total packets transmitted is 7200, and the effective coding ratio is 1/4.

As such, the type II HARQ system uses the lowest coding ratio of 1/4 for the initial transmission and creates the entire code word packet. Then, the entire code word packet is properly divided and is transmitted at each retransmission request.

However, standardization committees (e.g. 3GPP LTE) stipulate that the BLER during initial transmission must be lower than 10%, which means that at least 90% of the initial transmission must proceed without error. Assuming that an LDPC code is used in such a case, the coding and decoding must be based on the lowest coding ratio of 1/4. This increases the complexity compared with the case of coding/decoding based on a high coding ratio. In addition, the LDPC code itself is not free in terms of the coding ratio. Therefore, the complexity can be substantially reduced if coding and decoding are conducted based on a corresponding coding ratio at the request of initial transmission and retransmission.

SUMMARY OF THE INVENTION

An aspect of the present invention is to address at least the above-mentioned problems and/or disadvantages and to provide at least the advantages described below. Accordingly, as aspect of the present invention is to provide an apparatus and method for transmitting/receiving signals in a communication system in such a manner that the complexity of the communication system is reduced.

It is another aspect of the present invention to provide an apparatus and method for transmitting/receiving signals in a communication system, wherein, during initial transmission, a code word packet is created from a mother code having a high coding ratio and is transmitted.

Furthermore, it is another aspect of the present invention to provide an apparatus and method for transmitting/receiving signals in a communication system, wherein, if a retransmission request is made, a code word packet having a coding ratio lower than that of the initial transmission is created and transmitted.

In order to accomplish these aspects of the present invention, a method for transmitting/receiving a signal in a communication system is provided. The method includes inputting an information word during initial transmission and transmitting a first code word created by encoding the input information word based on a first coding ratio and transmitting a portion of a second code word created by encoding the first code word based on a second coding ratio at a retransmission request.

In accordance with another aspect of the present invention, an apparatus for transmitting/receiving a signal in a communication system is provided. The apparatus includes a controller for inputting an information word during initial transmission, for transmitting a first code word created by encoding the input information word based on a first coding ratio and for transmitting a portion of a second code word created by encoding the first code word based on a second coding ratio at a retransmission request.

BRIEF DESCRIPTION OF THE DRAWINGS

The above and other exemplary features, aspects, and advantages of certain exemplary embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention proposes an apparatus and method for transmitting/receiving signals in a communication system using a HARQ. Exemplary embodiments of the present invention conduct coding/decoding by using the highest coding ratio during initial packet transmission and, every time a retransmission request is made, conduct coding/decoding according to a coding ratio which is lower than the coding ratio used to transmit previous packets. As such, exemplary embodiments of the present invention propose a scheme for reducing the complexity based on coding/decoding, as well as an apparatus for properly implementing the scheme.

An exemplary embodiment of the present invention will now be described with reference to a type II HARQ system as a communication for transmitting/receiving signals based on a HARQ. However, those skilled in the art can easily understand that the present invention is not limited to the type II HARQ system, but is applicable to other types of method or systems for transmitting/receiving signals by using the HARQ.

A retransmission process for reducing the complexity in a HARQ system according to an exemplary embodiment of the present invention will now be described with reference to FIG. 2.

Figure 2:
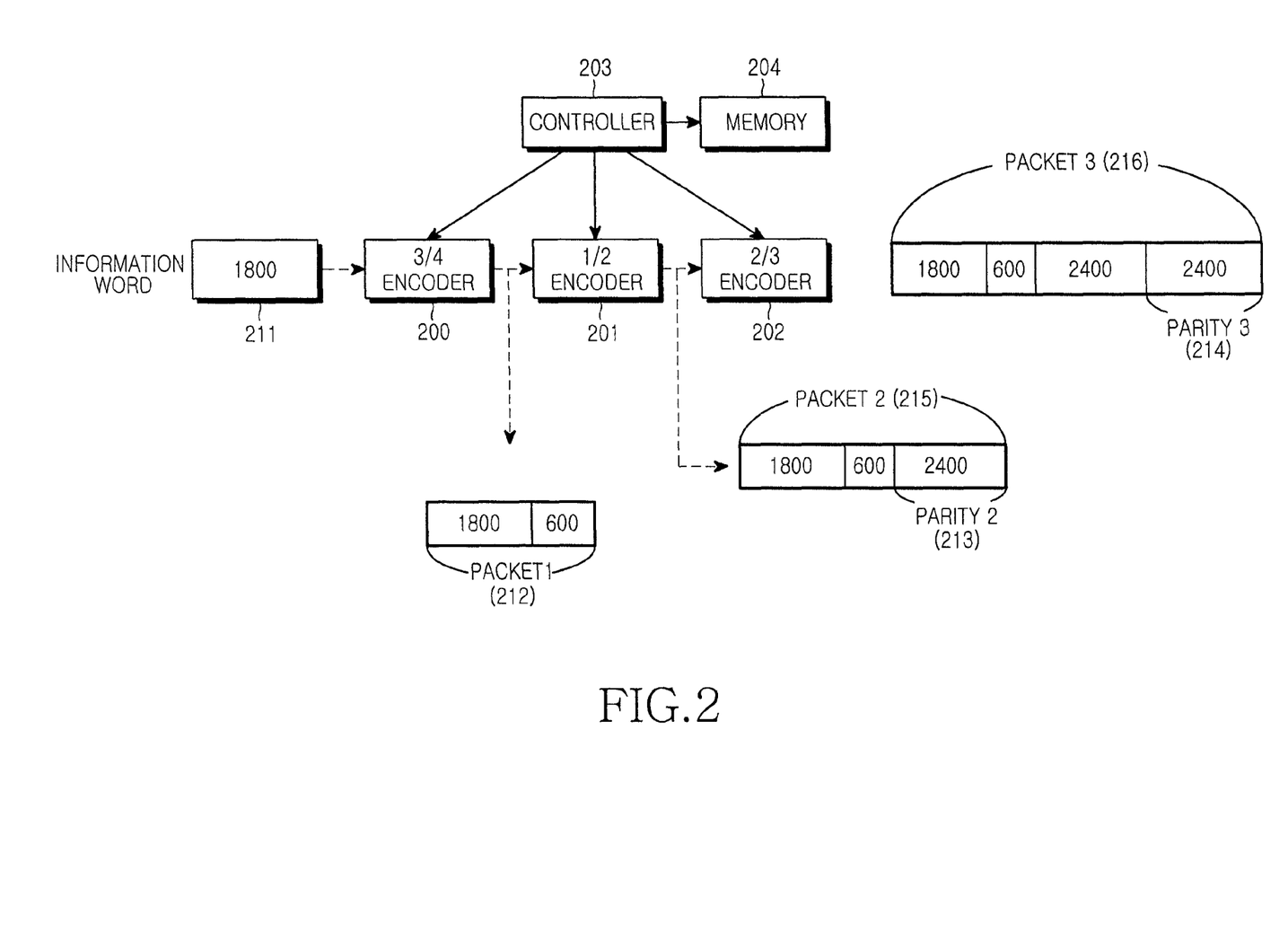
FIG. 2 illustrates a retransmission process for reducing the complexity in a HARQ system according to an exemplary embodiment of the present invention.

FIG. 2 illustrates a retransmission process for reducing the complexity in a HARQ system according to an exemplary embodiment of the present invention.

Referring to FIG. 2, the HARQ system includes a code word packet to be transmitted initially, an information word portion, a to-be-transmitted parity portion of a code word packet and encoders. The to-be-transmitted parity portion of a code word packet is obtained by inputting a code word transmitted just before and by coding the packet during each retransmission. Reference numerals 200-204 in FIG. 2 refer to encoders 200, 201, and 202, a controller 203, and a memory 204 to be used for retransmission in the HARQ system according to an exemplary embodiment of the present invention. Reference numerals 211, 212, 215 and 216 each refer to packets which have been input into encoders having a predetermined coding ratio, coded, and/or output. The effective coding ratio, as defined previously, does not refer to the coding ratio of packets encoded by encoders, but is based on an information word during initial transmission of the entire packet.

For initial transmission in the HARQ system, the controller 203 inputs an information word 211 into the 3/4 encoder 200 having a coding ratio of 3/4 as shown in FIG. 2. The 3/4 encoder 200 then creates first packet 212. The information word 211 has a length corresponding to 1800 symbols, and the first packet 212 has a length corresponding to 2400 symbols. The first packet 212, which is created by the 3/4 encoder 200, has an effective coding ratio of 3/4 and a systematic structure. The first packet 212 of 2400 symbols is stored in the memory 204 under the control of the controller 203.

An exemplary process for creating a packet for retransmission when a retransmission request is made in a HARQ system will now be described. The controller 203 inputs the first packet 212, which is stored in the memory 204, into the 1/2 encoder 201, which then creates a second parity 213. The second packet 215 created by the 1/2 encoder 201 has a length corresponding to 4800 symbols, and the second parity 213, which is a coding packet for retransmission, has a length corresponding to 2400 symbols. The second packet 215, which is created by the 1/2 encoder, has an effective ratio of 3/8 and a systematic structure. The second packet 215 of 4800 symbols is stored in the memory 204 under the control of the controller 203.

An exemplary process for creating a packet for retransmission when another retransmission request is made in a HARQ system will now be described. Similar to that described above, the controller 203 inputs the second packet 215, which is stored in the memory 204, into the 2/3 encoder 202, which then creates a third parity 214. The third packet 216 created by the 2/3 encoder 202 has a length corresponding to 7200 symbols, and the third parity 214 for retransmission has a length corresponding to 2400 symbols. The third packet 216, which is created by the 2/3 encoder, has an effective coding ratio of 1/4 and a systematic structure. The third packet 216 of 7200 symbols is stored in the memory 204 under the control of the controller 203.

A parity check matrix for a packet retransmission method according to an exemplary embodiment of the present invention will now be described with reference to FIG. 3.

Figure 3:
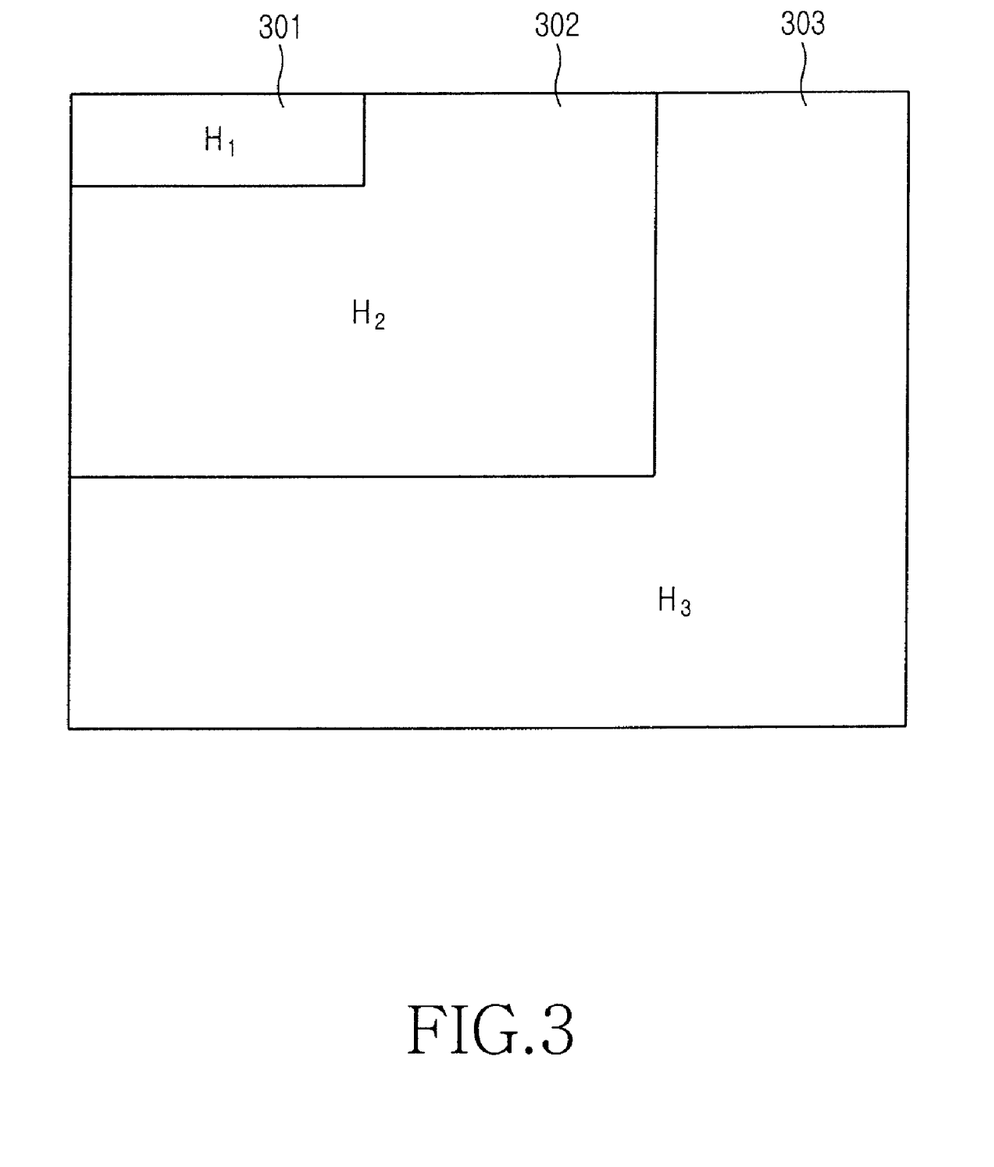
FIG. 3 illustrates a parity check matrix for packet retransmission according to an exemplary embodiment of the present invention.

FIG. 3 illustrates a parity check matrix for packet retransmission according to an exemplary embodiment of the present invention.

The 3/4 encoder 200, the 1/2 encoder 201, and the 2/3 encoder 202 shown in FIG. 2 are defined by the parity check matrices shown in FIG. 3. Particularly, the 3/4 encoder 200 uses parity check matrix H1 301 to encode an inputted code word, which has an effective coding ratio of 3/4. The 1/2 encoder 201 uses parity check matrix H2 302 to encode an inputted code word, which has an effective coding ratio of 3/8. The 2/3 encoder 202 uses parity check matrix H3 303 to encode an inputted codeword, which has an effective coding ratio of 1/4.

In an exemplary implementation, the HARQ system must optimize the 3/4, 1/2, and 2/3 codes according to the effective coding ratio so that the performance is improved. In the case of an LDPC code, density evolution may be used to obtain optimized codes. A puncturing or extension method may be used to create a code satisfying the coding ratio in the case of the LDPC code. It is assumed in the description of an exemplary embodiment of the present invention that the extension method is used to design the LDPC code. The extension method uses a 3/4 code as the mother code and adds an independent parity check formula and a new parity bit to obtain 3/8 and 1/4 codes. The optimization, as used herein, means that the performance of codes created to satisfy the coding ratio based on puncturing or extension approximates that of code words initially created to correspond to the same coding ratio.

Referring to FIG. 3, H2 302 refers to a parity check matrix created by extending H1 301 based on density evolution, and H3 303 refers to a parity check matrix created by extending H2 302 based on the density evolution of H2 302.

In general, the coding/decoding complexity of the LDPC code increases in proportion to the size of the parity check matrix, i.e. its number of rows and columns. Therefore, H1 301 has the lowest coding/decoding complexity, while H3 303 has the highest.

A retransmission protocol process according to an exemplary embodiment of the present invention will now be described with reference to FIG. 4.

Figure 4:
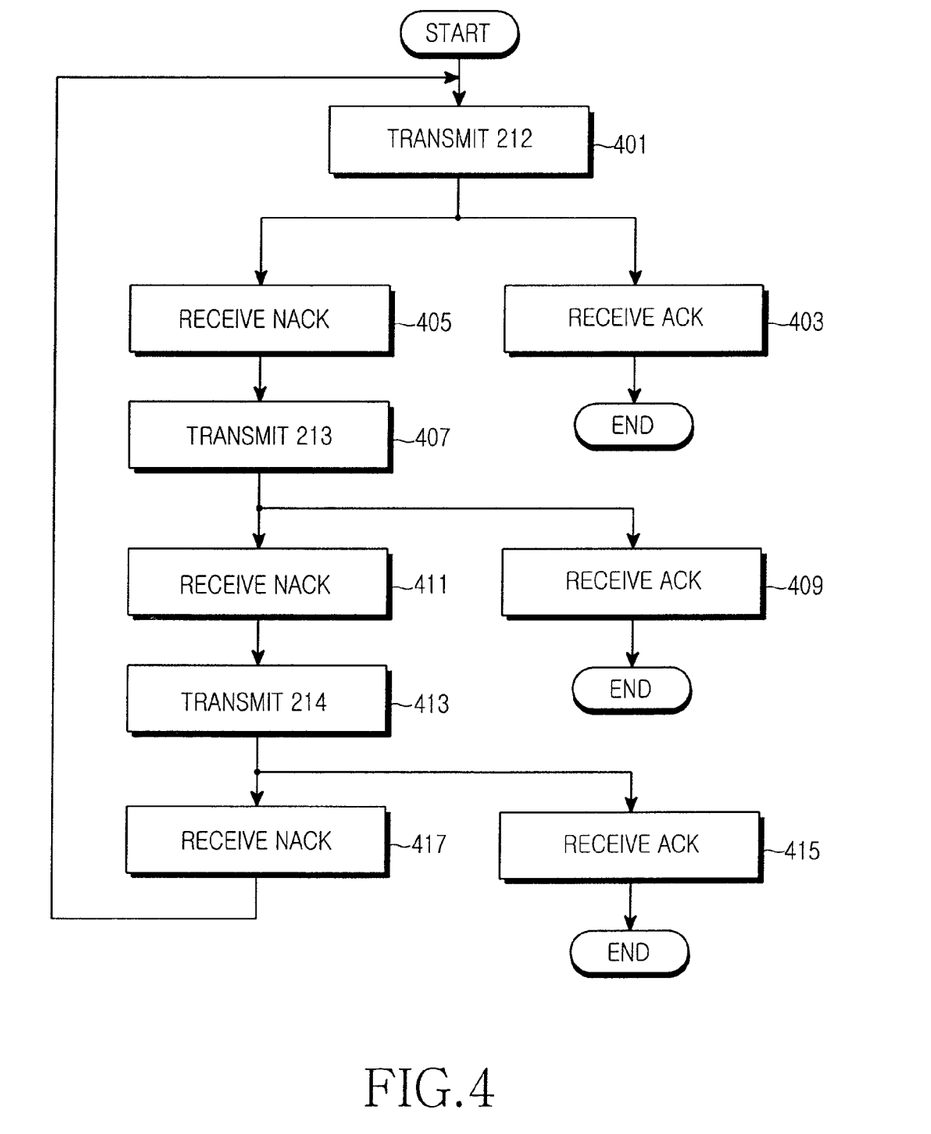
FIG. 4 illustrates a process regarding a retransmission protocol according to an exemplary embodiment of the present invention.

FIG. 4 illustrates a process regarding a retransmission protocol according to an exemplary embodiment of the present invention.

Referring to FIG. 4, the transmitter sends a first packet 212, which includes an information word, to the receiver in the initial transmission step 401. If an ACK is received from the receiver in step 403, the process is terminated. The effective coding ratio is 3/4 when the first packet 212 is transmitted.

If the transmitter receives a NACK from the receiver in step 405 after transmitting the first packet 212 to the receiver in step 401, the transmitter sends a second parity 213 in step 407. The second parity 213 is a packet composed of a parity in a code word created from a code having an effective coding ratio lower than 3/4. If the transmitter receives an ACK from the receiver in step 409 after sending the second parity 213 in step 407, the process is terminated. The effective coding ratio is 3/8 when the second parity 213 is sent. If the transmitter receives a NACK from the receiver in step 411 after sending the second parity 213 to the receiver in step 407, the transmitter sends a third parity 214, which is a packet composed of a parity in a code word created from a code having the lowest effective coding ratio as shown in FIG. 2, in step 413. If the transmitter receives an ACK from the receiver in step 415 after sending the third parity 214 in step 413, the process is terminated. The effective coding ratio is 1/4 when the third parity 214 is sent. If the transmitter receives a NACK from the receiver in step 417 after sending the third parity 214 to the receiver in step 413, the transmitter sends the first packet 212 again, because there is no code having a lower coding ratio in this exemplary embodiment.

The next process is substantially the same as the above-mentioned process after sending the first packet 212. Assuming that the maximum number of allowable transmissions is three, the packet transmission is aborted if a NACK is received from the receiver after the maximum number of allowable transmissions is reached (i.e. after three times of transmission).

As mentioned above, a code having the lowest coding/decoding complexity but the highest coding ratio is created and initially transmitted. If a retransmission request is made, a code is created by extending the code of the highest coding ratio so that it has a lower coding ratio, and is transmitted. This advantageously reduces the complexity.

A transmitting apparatus according to an exemplary embodiment of the present invention will now be described with reference to FIG. 5.

Figure 5:
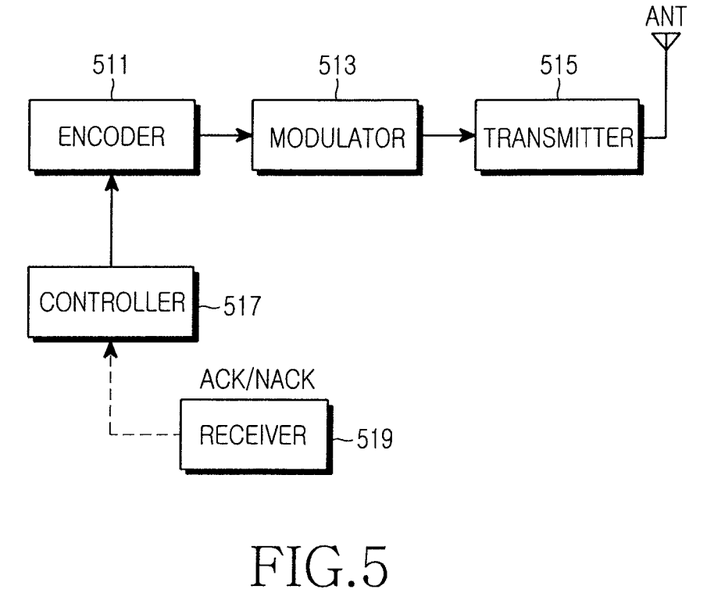
FIG. 5 illustrates a transmitting apparatus according to an exemplary embodiment of the present invention.

FIG. 5 illustrates a transmitting apparatus according to an exemplary embodiment of the present invention.

Referring to FIG. 5, the transmitting apparatus includes an encoder 511, a modulator 513, a transmitter 515, and a controller 517.

The encoder 511 is adapted to encode a packet according to a coding ratio of a code determined by the controller 517. The modulator 513 is adapted to modulate the packet and send it to the transmitter 515. The transmitter 515 is adapted to transmit a packet of a code determined by the controller 517. In addition, the transmitter 515 determines whether to retransmit or discard the packet according to a feedback signal. The controller 517 stores the location of a packet created based on a coding ratio every time a retransmission request is made and determines a packet to be sent by the transmitter 515. A receiver 519 is adapted to receive an ACK/NACK and forward it to the transmitter 517. The transmitter 515 may conduct an exemplary procedure such as that shown in FIG. 4 according to the received ACK/NACK.

The controller 517 may select from a number of encoders, which are optimized in a manner substantially the same as that described with reference to FIG. 3, according to a coding ratio. Alternatively, the controller 517 may have a single encoder incorporating both a function of creating a parity check matrix and a function of supporting a variable coding ratio. As mentioned with reference to FIG. 2, a number of encoders 511 may exist based on coding ratios so that they are used according to whether or not retransmission is conducted. Those skilled in the art can easily understand that the encoders 511 can create an encoder corresponding to a coding ratio according to whether or not retransmission is conducted so that a packet is encoded.

A receiving apparatus according to an exemplary embodiment of the present invention will now be described with reference to FIG. 6.

Figure 6:
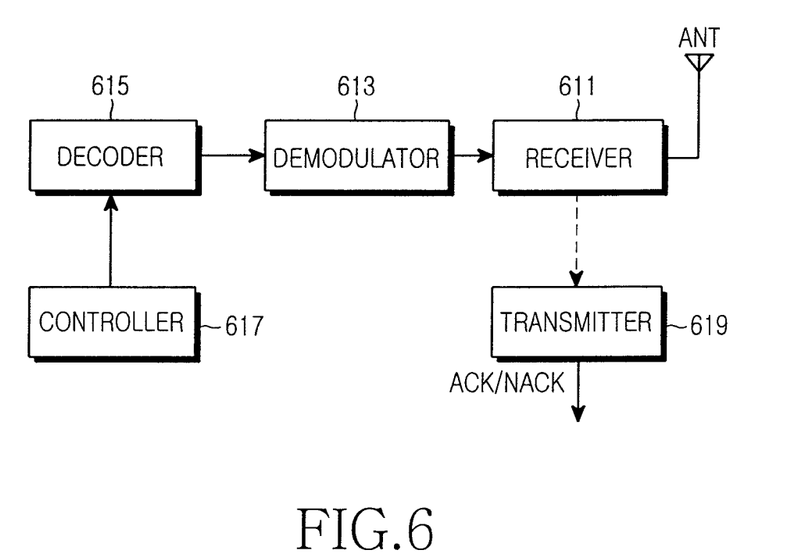
FIG. 6 illustrates a receiving apparatus according to an exemplary embodiment of the present invention.

FIG. 6 illustrates a receiving apparatus according to an exemplary embodiment of the present invention.

Referring to FIG. 6, the receiving apparatus includes a receiver 611, a demodulator 613, a decoder 615, a controller 617, and a transmitter 619.

The receiver 611 is adapted to process a packet transmitted by the transmitting apparatus. The controller 617 is adapted to store a retransmission scheme based on a coding ratio according to a retransmission request and to control the receiver 611 so as to process the packet according to the retransmission scheme. The receiver 611 is adapted to transfer the packet to the transmitter 619 so that the transmitter 619 transmits a feedback signal. In other words, the transmitter 619 transmits an ACK or NACK according to the result of packet processing.

The demodulator 613 conducts demodulation according to the modulation scheme adopted by the transmitting apparatus. The decoder 615 conducts decoding according to the encoding scheme adopted by the transmitting apparatus under the control of the controller 617.

As described above, exemplary embodiments of the present invention are advantageous in that, if an erroneous packet is to be retransmitted in a communication system using a HARQ, a code word having a high coding ratio is created and initially transmitted and, at a retransmission request, an extended code having a coding ratio lower than that of the initial transmission is created and transmitted. This reduces the complexity of coding and decoding.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting/receiving a signal in a communication system, the method comprising:
    inputting an information word during an initial transmission, generating a first code word by encoding the input information word using a first parity check matrix, the first code word having a first coding ratio includes the information word and first parity bits, and transmitting the first code word to a receiver;
    inputting the first code word during a first retransmission, generating a second code word by encoding the inputted first code word using a second parity check matrix, the second code word having a second coding ratio includes the information word, the first parity bits and second parity bits, and transmitting the second parity bits to the receiver; and
    inputting the second code word during a second retransmission, generating a third code word by encoding the inputted second code word using a third parity check matrix, the third code word having a third coding ratio includes the information word, the first parity bits, the second parity bits and third parity bits, and transmitting the third parity bits to the receiver,
    wherein the second parity check matrix is generated by extending the first parity check matrix using a density evolution, the third parity check matrix is generated by extending the second parity check matrix using the density evolution, and
    wherein a mother code of the density evolution is the first coding ratio, the density evolution represents an extension scheme adding new parity bits to the first parity check matrix.

2. The method as claimed in claim 1, wherein the first coding ratio exceeds the second coding ratio and the second coding ratio exceeds the third coding ratio.

3. An apparatus for transmitting/receiving a signal in a communication system, the apparatus comprising:
    a first encoder for inputting an information word during an initial transmission, and for generating a first code word by encoding the input information word using a first parity check matrix, the first code word having a first coding ratio includes the information word and first parity bits; a second encoder for inputting the first code word during a first retransmission, and for generating a second code word by encoding the inputted first code word using a second parity check matrix, the second code word having a second coding ratio includes the information word, the first parity bits and second parity bits;
    a third encoder for inputting the second code word during a second retransmission, and for generating a third code word by encoding the inputted second code word using a third parity check matrix, the third code word having a third coding ratio includes the information word, the first parity bits, the second parity bits and third parity bits; and
    a controller of a transmitter for transmitting the first code word to a receiver during the initial transmission, for transmitting the second parity bits to the receiver during the first retransmission, and for transmitting the third parity bits to the receiver during the second retransmission,
    wherein the second parity check matrix is generated by extending the first parity check matrix using a density evolution, the third parity check matrix is generated by extending the second parity check matrix using the density evolution, and
    wherein a mother code of the density evolution is the first coding ratio, the density evolution represents an extension scheme adding new parity bits to the first parity check matrix.

4. The apparatus as claimed in claim 3, wherein the first coding ratio exceeds the second coding ratio and the second coding ratio exceeds the third coding ratio.

* * * * *